(12) United States Patent
Mühlbauer et al.

(10) Patent No.: US 11,447,604 B2
(45) Date of Patent: Sep. 20, 2022

(54) METHOD FOR THE SEPARATION OF VOLATILE COMPOUNDS FROM VISCOUS PRODUCTS BY MEANS OF A THIN-FILM EVAPORATOR, AND POLYLACTIDE RESIN

(71) Applicants: UHDE INVENTA-FISCHER GMBH, Berlin (DE); thyssenkrupp AG, Essen (DE)

(72) Inventors: Udo Mühlbauer, Berlin (DE); Rainer Hagen, Berlin (DE)

(73) Assignees: UHDE INVENTA-FISCHER GMBH, Berlin (DE); THYSSENKRUPP AG, Essen (DE)

( * ) Notice: Subject to any disclaimer, the term of this patent is extended or adjusted under 35 U.S.C. 154(b) by 485 days.

(21) Appl. No.: 16/346,899

(22) PCT Filed: Nov. 3, 2017

(86) PCT No.: PCT/EP2017/078115
§ 371 (c)(1),
(2) Date: May 2, 2019

(87) PCT Pub. No.: WO2018/086988
PCT Pub. Date: May 17, 2018

(65) Prior Publication Data
US 2019/0352457 A1   Nov. 21, 2019

(30) Foreign Application Priority Data
Nov. 8, 2016 (EP) ..................... 16197639

(51) Int. Cl.
| C08G 63/90 | (2006.01) |
| B01D 1/00 | (2006.01) |
| B01D 1/06 | (2006.01) |
| C08G 63/08 | (2006.01) |
| C08G 63/78 | (2006.01) |

(52) U.S. Cl.
CPC ........... *C08G 63/90* (2013.01); *B01D 1/0082* (2013.01); *B01D 1/065* (2013.01); *C08G 63/08* (2013.01); *C08G 63/785* (2013.01)

(58) Field of Classification Search
CPC ...... C08G 63/90; C08G 63/08; C08G 63/785; B01D 1/0082; B01D 1/065
See application file for complete search history.

(56) References Cited

U.S. PATENT DOCUMENTS

| 3,542,112 A | 11/1970 | Monty | |
| 5,844,066 A | 12/1998 | Kakizawa | |
| 6,187,901 B1 * | 2/2001 | Koskinen | C08G 63/08 |
| | | | 528/483 |
| 6,326,458 B1 * | 12/2001 | Gruber | C07D 319/12 |
| | | | 525/415 |
| 2006/0128905 A1 | 6/2006 | Yokoyama | |
| 2013/0267675 A1 | 10/2013 | Yoshida | |
| 2015/0361214 A1 * | 12/2015 | Nemoto | C08L 67/04 |
| | | | 524/711 |
| 2018/0128557 A1 * | 5/2018 | Peters | B01D 1/0082 |

FOREIGN PATENT DOCUMENTS

| CH | 523087 A | 5/1972 |
| CN | 1723230 A | 1/2006 |
| CN | 102131796 A | 7/2011 |
| CN | 104874195 A | 9/2015 |
| EP | 0 499 747 A | 8/1992 |
| EP | 1 070 097 A | 1/2001 |
| EP | 1612230 A | 1/2006 |
| EP | 2 698 392 A | 2/2014 |
| EP | 2 698 394 A | 2/2014 |
| JP | 7-185201 A | * 7/1995 |
| JP | H07185201 A | 7/1995 |
| TW | 201434823 A | 9/2014 |
| TW | 201522493 A | 6/2015 |
| WO | 98/36012 A | 8/1998 |
| WO | 2014115486 A | 7/2014 |

OTHER PUBLICATIONS

English Translation of International Search Report issued in PCT/EP2017/078115, dated Nov. 3, 2017.
J. Dorgan et al., Fundamental Solution and Single-Chain Properties of Polylactides, Journal of Polymer Science: Part B: Polymer Physics, vol. 43, 3100-3111, Sep. 21, 2005, pp. 3100-3111.
NatureWorks, Best Practices for Ingeo™ Processing, (2015), pp. 5-7.
International Standard ISO 1652, Rubber latex—Determination of apparent viscosity by the Brookfield test method Fourth edition (Mar. 15, 2011).
Sulzer Chemtech Ltd., Polymer Production Technology pp. 1-12, (accessed Apr. 2017).

* cited by examiner

*Primary Examiner* — Rabon A Sergent

(74) *Attorney, Agent, or Firm* — thyssenkrupp North America, LLC

(57) ABSTRACT

A method for removing compounds in the gaseous aggregate state from PLA-containing products in the viscous aggregate state by means of a thin-film evaporator. The compounds may be present in the liquid or solid aggregate state in the products under standard conditions. The invention further relates to a polylactide resin prepared in accordance with the method of the invention.

20 Claims, 3 Drawing Sheets

METHOD FOR THE SEPARATION OF VOLATILE COMPOUNDS FROM VISCOUS PRODUCTS BY MEANS OF A THIN-FILM EVAPORATOR, AND POLYLACTIDE RESIN

CROSS REFERENCE TO RELATED APPLICATIONS

This application is a U.S. National Stage Entry of International Patent Application Serial Number PCT/EP2017/078115, filed Nov. 3, 2017, which claims priority to European Patent Application No. EP 16197639.4, filed Nov. 8, 2016, the entire contents of both of which are incorporated herein by reference.

FIELD

The present disclosure generally relates to a method for removing compounds in the gaseous aggregate state from PLA-containing products in the viscous aggregate state by means of a thin-film evaporator.

BACKGROUND

Polylactic acid (PLA) is prepared predominantly by ring-opening polymerization of lactide in the melt at final temperatures of between 160° C. and 200° C. The polymerization leads to a chemical ring-chain equilibrium in which, depending on the final temperature, there is between 3% and 5% of unreacted monomer. Alternatively the polymerization may also be discontinued at an incomplete conversion, in which case the monomer concentration may be up to 20% or more, depending on economic aspects. In any case, the unreacted monomer must be removed from the polymer in order to produce a PLA which can be used technically. A condition for such use is a residual monomer content of <0.5%, in order to prevent smoking, contamination and corrosion of the environment with lactide in the course of processing from the melt. Moreover, substantial residual monomer concentrations are detrimental to the mechanical and thermal properties of articles made of PLA. Not least, residual lactide in the PLA, through the absorption of atmospheric moisture, promotes hydrolytic degradation.

On the industrial scale, removal is generally accomplished by evaporation under reduced pressure (reduced-pressure demonomerization). For this step, a very wide variety of different apparatuses have been proposed, including devolatilizing extruders, extractors, spinning disk reactors and thin-film evaporators.

The latter are based on the principle that, by distributing material in a thin layer on the inside face of a temperature-conditionable housing wall, it is possible to achieve a high thermal current density, thereby ultimately enabling a high evaporation performance and high evaporation ratios in one pass.

For the distribution of the material, provision may be made in particular for rotors fitted with wiper elements; corresponding thin-film evaporators, equipped additionally with a system for conveying material, are known to the skilled person under the term "film truders".

A thin-film processing apparatus in the form of a film truder is described, for instance, in CH 523 087, according to which a drivable rotor is arranged coaxially in a heatable and/or coolable treatment chamber, this rotor having a tubular body with inclined vanes distributed uniformly over its periphery and also carrying wiper blades which extend axially into the vicinity of the inside face of the housing jacket or which contact the inside face. In operation, the material for treatment is captured by the wiper blades which have been set in rotation, and is distributed in a thin layer over the inside wall of the housing, whereas the inclined vane parts impart a movement component directed toward the outlet on the material captured.

The industrial scale requires an economic operation in order to be able to compete on price with the existing polymers, which are mostly petroleum-based. The economics of a method are made up of the capital costs for the apparatus and installation thereof and also the operating costs arising from the consumption of energy and auxiliaries. Multi-stage methods with large numbers of apparatuses, therefore, should be avoided, as should the use of entrainers which, while indeed facilitating the evaporation of the monomer and hence leading to a lower residual monomer content, at the same time increase the operating costs.

For monomer removal, EP 0 499 747 A2 proposes falling-strand devolatilizers, devolatilizing extruders or thin-film evaporators. The vapours from the devolatilization are deposited in one or more serially connected condensers. Reduced pressure is generated using single-stage or multi-stage assemblies which are otherwise unidentified and which generate a reduced pressure of down to 0.002 atm (=2 mbar). In order to reduce the partial pressure of the lactide to be removed, and so to facilitate the evaporation and lower the residual monomer content of the polymer, the possibility is mentioned of adding entrainers such as nitrogen, toluene and ethylbenzene. Although not explicitly stated, the use of the term "condenser" and the pressure of 2 mbar suggest that the vapours are deposited in liquid form. At the same time, therefore, the reduced pressure which can be employed, and the residual monomer content, are limited. A drawback of this method is a comparatively high residual monomer content after monomer evaporation, if the lactide removed is deposited in liquid form above its triple point. While it is indeed possible to reduce the residual monomer content by adding entrainers, to do so raises the operating costs of the method (entrainer costs and higher energy demand of the reduced-pressure plant).

WO 98/36012 prefers a falling-strand devolatilizer for reduced-pressure evaporation, with the polymer melt falling downwards in the form of filaments into a container which apparently is not under reduced pressure. Hot inert gas such as nitrogen or dry air is blown into the devolatilizer in order to aid the evaporation of the lactide from the surface of the falling filaments. The hot, lactide-containing gas, after departing from the devolatilizing apparatus, is rapidly cooled to 20-40° C., the lactide being precipitated as a crystalline dust. This is preferably accomplished in a "crystallization chamber" by mixing with cold air. A drawback of this method is the mixing of the lactide with large quantities of inert gas, which make it difficult to recover the lactide entirely and necessitate very large apparatuses for separating the gas from the lactide dust (cyclone, gas filter). The most significant drawback, however, is that the demonomerization is carried out under atmospheric pressure and therefore a residual monomer content of 0.5% is unattainable. Apart from this, the falling-strand apparatus does generate a large surface area, but surface renewal is closely limited to the surroundings of the nozzle bores from which the melt emerges. It subsequently occurs only through slow tapering of the strand, thus necessitating very long fall distances. Mass exchange performance overall, therefore, is limited, and residual monomer concentrations of the order of 0.5% are not attained even under reduced pressure.

EP 1 070 097 describes a process for the preparation of PLA, starting from lactide, that consists of the following process steps: polymerization, stabilization, demonomerization, granulation, and crystallization/drying. For the demonomerization, the machinery and apparatus already mentioned in the texts cited above are stated. Thin-film evaporation is the preferred method here, owing to the effective surface renewal due to the rotors, thereby promoting the evaporation of the dilactide. The specification indicates the preferred pressure range between 0.5 mm Hg and 5 mm Hg and the temperature range between 200° C. and 260° C. The specified ranges are very broad and, particularly with regard to the temperature, the upper limits are outside practicable values. PLA is known to be sensitive to temperature and ought not to be processed above 240° C., better still not above 220° C.; in this regard, see, for example, the "Processing Guides" from NatureWorks, the PLA-producing subsidiary of the applicant, Cargill.

The specification is limited to a general description of thin-film evaporation and of its application to the demonomerization for PLA within the stated pressure and temperature ranges. There are no details of important process parameters, such as peripheral rotor speed, PLA melt viscosity, apparatus residence time, monomer content and molecular weight before and after demonomerization. Receiving little mention too is the important fact that as a result of the rotor movement, energy is carried into the melt and the temperature of the melt increases as a result. This fact appears either not to be known to the applicant, or to be approved by the applicant. The large temperature span suggests the latter. In that case, however, there is a likelihood of a marked drop in molecular weight and hence in thermal damage to the product, a phenomenon frequently manifested in the form of a yellow coloration.

Lastly, Purac/Sulzer in EP2698392, or else the Sulzer company brochure "Polymer Production Technology", describes a two-stage demonomerization process which is static, in other words not possessing moving internals. The process is characterized by a high level of deployment of apparatus—each stage consists of a static mixer/heat exchanger and a demonomerization apparatus which is under high vacuum. Because of the lack of surface renewal as a result of mechanical movement of the melt, the specific surface-to-volume ratio must be very large and the falling distance of the strands very long. Both factors sharply increase the size of apparatus. For the process, therefore, four costly and inconvenient pieces of apparatus are needed. In spite of the large apparatus, it is necessary, as described in the brochure, to add a stripping agent in order to achieve low monomer contents. This raises the operating costs (vacuum energy demand, stripping agent costs) considerably. For large-scale industrial production plants in particular, therefore, this process is economically unfavourable. Because of the lack of a central stirrer shaft, the inflow to the discharge pump in the discharge region is not supported by downwardly conveying stirring elements. The product is able to flow to the pump only by gravity. In the case of highly viscous polymers with viscosities of more than 2000 Pa·s, of the kind which occur in the case of PLA, this entails a comparatively high pump inflow head. That in turn increases the residence time in the apparatus. Monomer is reformed and molecular weight is reduced. Both factors are detrimental to product. Moreover, in a cone without forced flow to the discharge pump, dead zones are formed, in which the product resides for a long time and is degraded to form solid black particles, frequently referred to in the art as black specks. These black specks are encountered in the product and cause problems when the product is processed into films, bottles and fibres.

As mentioned, thin-film treatment apparatuses are designed for the treatment of viscous material. In the case of polylactide, however, which represents a temperature-sensitive material, the problem arises in this regard that because of the relatively high viscosity, a relatively high amount of dissipation energy is carried into the material via the rotor shaft. Together with the heat introduced via the housing jacket, this may result in the thermal load becoming too high, and the material may suffer damage as a result. In the interest of high material throughput, conversely, the process heat is to be maintained as high as possible. Accordingly, in the case of a thin-film evaporator, the process heat is to be kept as high as possible in order to ensure a maximum evaporation performance. Moreover, by means of the high process heat, a large diffusion coefficient is to be obtained in order to promote mass transport.

Thus a need exists for a method for removing volatile compounds from viscous PLA-containing products, wherein the products are treated as gently as possible, and so the products suffer very largely no deterioration in quality. In particular it is an object of the present invention to remove monomers which have remained in the melt after a ring-opening polymerization of dilactide to PLA, and to do so as fully and gently as possible, while taking account of associated economic conditions.

DETAILED DESCRIPTION

Figure 1:
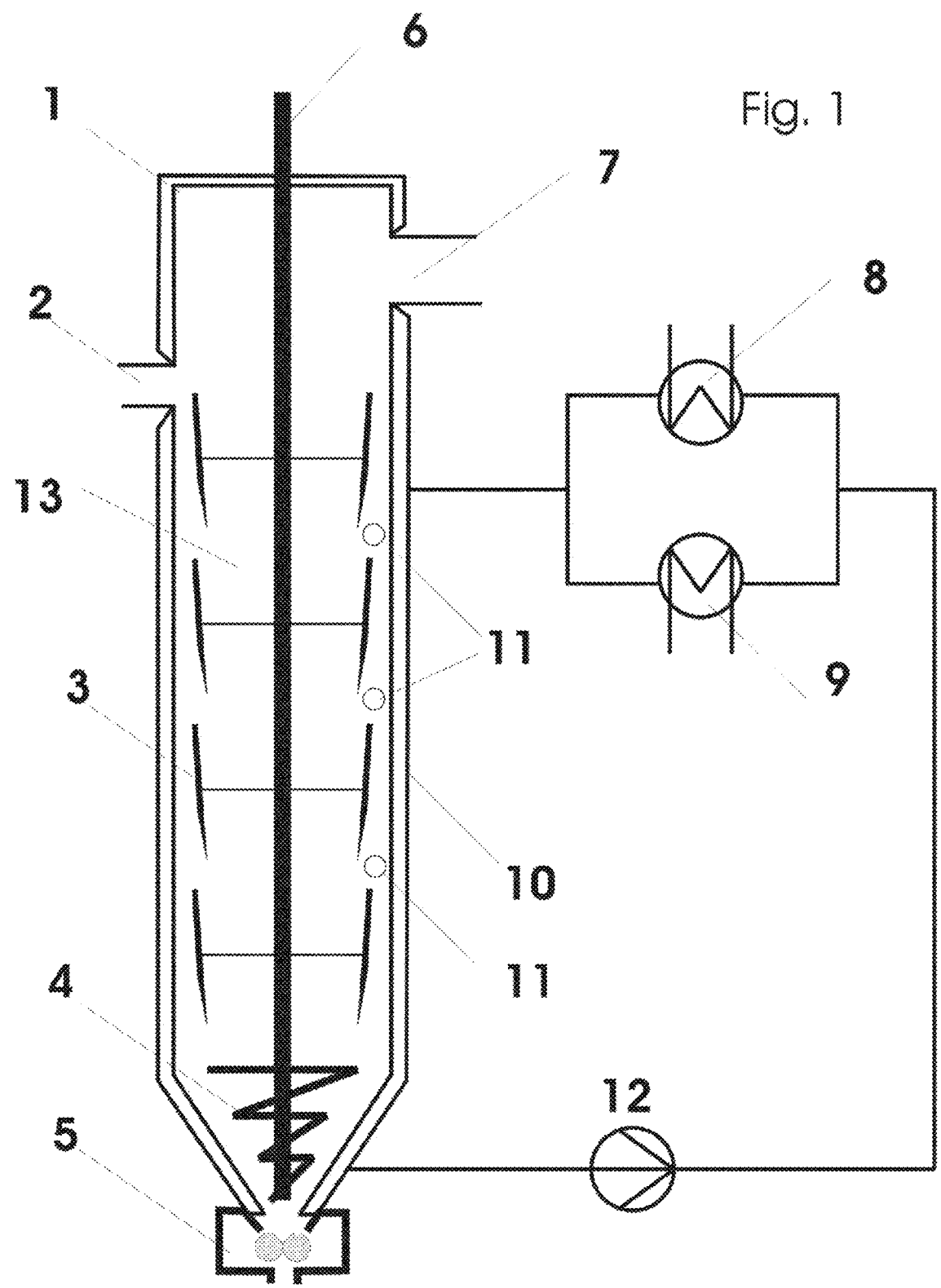
FIG. 1 is an embodiment of a thin-film treatment apparatus of the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for removing compounds in the gaseous aggregate state from PLA-containing products in the viscous aggregate state by means of a thin-film evaporator. The compounds may be present in the liquid or solid aggregate state in the products under standard conditions. The invention further relates to a polylactide resin prepared in accordance with the method of the invention.

"Gently" here means that the thermal load and the residence time during the demonomerization are low and the product suffers no damage, which may be manifested in a distinct reduction in molecular weight and in product discoloration. The removal of the monomer here ought to be complete, by which is meant a reduction of at least 5 times, more preferably 10 times, in the monomer content. The residual monomer content of the product ought preferably to be below 0.5%. Finally, the method must be economic for large-scale industrial production plants, this economy referring to extremely low operating costs and capital costs. It is important here in particular that the dilactide lost in vapour form from the melt is recovered and used again in the ring-opening polymerization.

A method for removing volatile compounds from polymer melts comprising PLA or lactide copolymers, is achieved by the features of the claims. The claims relate to a polylactide resin which is preparable in particular with the method of the invention and that has particular product properties. The dependent claims set out advantageous developments in each case.

The invention relates to a method for removing compounds in gaseous aggregate state from a polymer melt containing polylactide and/or a poly(co)lactide, said melt comprising said compounds in liquid or solid aggregate state, with a thin-film treatment apparatus comprising
  a housing having a heatable and/or coolable housing jacket which surrounds a rotationally symmetrical treatment chamber extending in axial direction,
  at least one inlet port, arranged in an inlet region of the housing, for introducing the material to be treated into the treatment chamber,
  at least one outlet port arranged in an outlet region of the housing, for discharging the material from the treatment chamber, and
  a drivable rotor shaft, arranged in the treatment chamber and extending coaxially, for generating a film of material on the inside face of the housing jacket and for conveying the material in the direction from the inlet region to the outlet region, the rotor shaft comprising a central rotor shaft body with rotor blades arranged on the periphery of said body, the radially outermost end of said blades being at a distance from the inside face of the housing jacket, and also
  at least one temperature sensor arranged in the treatment chamber for measuring the temperature of the film of material,
  wherein
  the polymer melt in viscous aggregate state is carried into the treatment chamber via the at least one inlet port,
  a film of the polymer melt is generated on the inside face of the housing jacket,
  wherein at least a portion of the compounds present in liquid or solid aggregate state in the polymer melt are converted into the gaseous aggregate state and discharged in the gaseous aggregate state from the thin-film treatment apparatus, and also
  the treated polymer melt is discharged via the at least one outlet port from the thin-film treatment apparatus,
  wherein permanent or temporary determination of a local temperature value of the film of the product is carried out at at least one location by means of the at least one temperature sensor.

The treatment chamber of the thin-film treatment apparatus therefore corresponds to the housing interior, in which the polymer melt comprising polylactide and/or poly(co)lactide is subjected to the method of the invention, in which, in particular, there is removal of volatile components, in particular by distillation, devolatilization and/or drying, from the polymer melt. The chamber is generally cylindrical in design, it nevertheless being conceivable or preferably for the chamber to have a conically tapered design in the outlet-side end region.

In general there is a discharge pump, preferably a gear pump, disposed in the outlet-side end region of the housing, for the purpose of discharging the polymer melt from the thin-film treatment apparatus.

As mentioned, the method of the invention is geared to the treatment of a polymer melt in the viscous aggregate state, this melt comprising polylactide and/or poly(co)lactide. "Viscous aggregate state" in the sense of the present invention refers typically to a polymer melt having a viscosity in the range from 1 to 50 000 Pa·s, more particularly from 50 to 15 000 Pa·s. The material for treatment in accordance with the invention preferably has, at least temporarily, a viscosity of more than 100 Pa·s, more preferably more than 300 Pa·s, with further preference more than 500 Pa·s, most preferably 1000 Pa·s to 6000 Pa·s, since above that viscosity there is a severe increase in the dissipation phenomena and the advantages of the invention are manifested to a particularly marked extent. The viscosity can be determined with, for example, a rotational viscometer in accordance with DIN ISO 1652:2013-02 at the respective temperature of the polymer melt.

By means of the temperature sensor of the thin-film treatment apparatus, the film of polymer melt that is generated and is distributed over the internal surface of the treatment chamber can be temperature-monitored with local resolution. The temperature measurement values obtained can therefore be used on the one hand to adjust optimum product film temperature conditions and on the other hand to help to prevent temperatures which go above or below critical temperatures.

The invention therefore allows the temperature of the film of polymer melt to be determined locally and allows, for example, at least one operating parameter to be adjusted depending on a deviation from a setpoint value, on the basis of the temperature or temperature profile determined. In particular, the quantity of heat to be taken off or carried into the polymer melt can be regulated, for example by corresponding temperature conditioning of the housing jacket, in order to adjust the process heat locally to the desired value, which in the case of a thin-film evaporation is typically high enough to ensure a high evaporation performance and low enough in order not to exceed a critical temperature above which there may be thermally induced damage to the material to be treated.

In order to adjust the desired process heat, the housing jacket may be heated or cooled by means of a preheated heat transfer medium. Alternatively or additionally, the process heat may also be regulated in its adjustment via the geometry and/or the rotary speed of the rotor shaft.

Ultimately, therefore, the present invention allows stable and reproducible operation to be ensured and allows the production of high-quality products to be enabled.

The compounds for removal are preferably selected from the group consisting of lactide, lactic acid, lactic acid dimers, and lactic acid oligomers that are in gaseous form under the prevailing operating conditions, water and additives of the polymer synthesis, such as, for example, catalysts, initiators or stabilizers, and also combinations thereof.

It is preferable, furthermore, if the rotor blades are operated with a rotary speed of 0.1 to 10 m/s, preferably 0.5 to 3 m/s, more preferably from 0.5 to 2 m/s. Alternatively or additively to this, the rotor blades are used to set a shear rate of not more than 1000 l/s, preferably 100 to 500 l/s, more preferably 200 to 300 l/s, with the shear rate being the ratio of peripheral speed to distance of the rotor blades from the inside wall of the treatment chamber.

According to another advantageous embodiment, the rotor shaft in the outlet region may carry an element which when the rotor shaft rotates, conveys the polymer melt in the direction of the outlet port. This conveying element may take the form, for example, of a conveying screw or worm or of a crown with a plurality of webs. A crown of this kind is described in CH 523087, for example.

As mentioned, the housing jacket is of heatable and/or coolable configuration. Generally, for this purpose, in the interior of the housing jacket there is a housing jacket cavity which is intended to be traversed by a flow of heat transfer medium for the purpose of heating and/or cooling. In this regard it is preferred for the housing jacket wall to have a double-wall design and for the space between the inside and outside housing jacket walls to be intended for traversal by a flow of the heat transfer medium.

In order to be able to act in a targeted way on the local process heat in the thin-film treatment apparatus, it is further preferred for the housing jacket to comprise at least two housing jacket segments, which are configured in order to be heated and/or cooled independently of one another. According to this embodiment, each housing jacket segment is preferably assigned its own separate heat transfer circuit system, with separate heat transfer inlet and separate heat transfer outlet.

It is further preferred here for the housing jacket segments in each case to surround a corresponding treatment chamber zone and for the temperature sensors to be distributed over different treatment chamber zones. Ideally, therefore, the treatment chamber is divided beforehand into different treatment chamber zones, in relation to the arrangement of the temperature sensors and the housing jacket segments, and in these zones, in comparison to the preceding treatment chamber zone, a relatively sharp change is expected in the composition and/or in the viscosity of the material. In this case, with particular preference, a plurality of temperature sensors are arranged in those treatment chamber zones in which, because of the anticipated viscosity increase, a relatively high introduction of dissipation energy is anticipated as well, so that the temperature can be monitored at relatively high resolutions specifically in these treatment chamber zones and, ultimately, the exceedance of a critical temperature can be reliably avoided. This is the case especially in the outlet-side end region of the treatment chamber.

By this means, a particularly preferred regime can be realized wherein the polymer melt temperature value obtained is used for adjusting the temperature of the heatable and/or coolable housing jacket to a predetermined setpoint value, in particular the housing jacket at least two housing jacket segments, which each possess at least one temperature sensor, and there is separate adjustment of the temperature in each housing jacket segment by means of a respective measurement value of the temperature of the film of the polymer melt in the respective housing jacket segment.

In the treatment chamber, in particular via a vapour port, a pressure is preferably established which is reduced relative to standard conditions, preferably a pressure of below 100 mbar, more preferably of below 10 mbar, very preferably of below 1 mbar. As a result, compounds can be discharged in the gaseous aggregate state, in an improved way, via the at least one vapour port. The compounds discharged are preferably recovered in a downstream apparatus for recovery of gaseous compounds, in particular from the gaseous aggregate state, by condensation and/or desublimation.

The residence time of the polymer melt in the thin-film treatment apparatus is preferably from 2 to 4 min, more preferably from 5 to 10 min.

In particular, the temperature of the heatable housing jacket, in particular in each of the housing jacket segments, is adjusted to a lower temperature than the temperature of the polymer melt fed into the treatment chamber, being conditioned in particular to a temperature of 130 to 250° C., preferably 160 to 240° C., in particular 180 to 220° C. For this purpose, the temperature of the polymer melt is determined at the inlet port.

An inert gas is preferably fed into the atmosphere in the interior of the thin-film treatment apparatus (10), in particular by way of the rotor shaft (34), preferably nitrogen, dried air and/or argon.

The blowing-in of inert gas may be performed in particular in lieu of the reduction of the pressure to below 1 mbar, thus allowing the evaporation of the monomer to be facilitated by introduction of an inert gas into the thin-film evaporator. The presence of the inert gas here acts like a pressure reduction in that it reduces the partial pressure of the monomer in the gas phase, thereby in turn increasing the driving concentration difference between melt and gas phase. In this way, the demonomerization may take place, for example, above the triple-point pressure of lactide, with a very good demonomerization performance at the same time. If the aim is to lower the residual monomer content still further, the inert gas may also be added at a pressure in the thin-film evaporator of less than 1 mbar.

Upstream of the inlet of the thin-film treatment apparatus there is preferably a mixing apparatus, more preferably a static mixer. Via such a mixer it is possible, before introduction of the polymer melt, into the treatment chamber, for deactivators, additives, stabilizers or mixtures and combinations thereof to be fed into the polymer melt.

The invention relates in particular to a method for demonomerizing a PLA melt in a thin-film evaporator. The method is applicable in particular to any polymer melt which consists substantially of lactide structural units, independently of the enantiomer composition, and has been prepared in a ring-opening polymerization.

Advantages achievable with the method of the invention include in particular those set out below.

Through the direct measurement of the temperature in the interior of the thin-film treatment apparatus, more particularly the thin-film evaporator, it is possible for the temperature of the products to be demonomerized to be monitored continuously and with local resolution. Particularly in the case of thermally sensitive or unstable products, such as PLA, the measurement values obtained can be used for the targeted adjustment of the temperatures in the heatable and/or coolable jacket of the thin-film treatment apparatus, more particularly the thin-film evaporator, as a control variable. Accordingly, for example, unforeseeable temperature increases occurring within the product can be recognized and compensated at an early stage. This allows the product in question to be demonomerized in the optimum temperature range, thus on the one hand achieving an extremely high demonomerization rate and on the other hand allowing prevention of thermal damage to the product.

The amount of the compounds in the product after passage through the thin-film treatment apparatus, more particularly thin-film evaporator, can be reduced significantly; in particular it is possible to attain reductions to not more than 0.2 times, preferably not more than 0.1 times, the amount of the compounds before passage through the thin-film treatment apparatus, more particularly the thin-film evaporator. A residual monomer content in the product of less than 0.5% can be achieved.

With the method of the invention, extremely gentle treatment of the product is possible. This is evident in particular from the yellowness index or yellow discoloration. The method of the invention makes it possible for the yellow discoloration, measured as b* value, during the implementation of the method to be increased by not more than 4 scale values, and for the b* value in the product to be less than 15.

The particular regime makes it possible for no dead zones to develop in the thin-film evaporator. As a result, in particular, the formation of what are called black specks can be very largely prevented with the method of the invention. More particularly, when the method of the invention is implemented, there are a maximum of 50 black specks per kilogram of discharged product. The product therefore contains less than 50 black specks per kilogram.

To a very large degree there is no reduction of the molecular weight of the product, especially in the case of polymers and/or copolymers. It has been possible to ascertain, surprisingly, that the weight-average molecular weight of the product after implementation of the method, after demonomerization, is not more than 20% lower than that of the product fed into the thin-film evaporator.

Preferred pressures, which can be applied to the thin-film evaporator via the at least one vapour port, for example, are advantageously below 100 mbar here, more preferably below 10 mbar, very preferably below 1 mbar. This reliably enables volatile compounds contained in the product to go over into the gaseous aggregate state and, as a result, to be discharged from the interior via the at least one vapour port, and for the compounds discharged to be recovered preferably in the apparatus for recovery of gaseous compounds, in particular from the gaseous aggregate state, by condensation and/or desublimation. The demonomerization is therefore operated in particular under reduced pressure. The rule here is that the lower the reduced pressure, the better the demonomerization performance. The thin-film treatment apparatus, preferably thin-film evaporator, is typically operated at a pressure of less than 10 mbar (absolute).

The invention relates, moreover, to a polylactide resin which in particular is preparable by the method described above. For this purpose, polylactide in the viscous aggregate state is carried into the thin-film treatment apparatus, preferably thin-film evaporator, via the inlet port into the thin-film evaporator, and within the thin-film evaporator a film of polylactide is generated, with at least a portion of the monomers present in the product, in this case lactide, being converted into the gaseous aggregate state, and lactide being discharged with the gas phase from the thin-film evaporator. The product of the invention here is distinguished by a weight-average molecular weight of between 50 000 g/mol and 500 000 g/mol, a yellow colouration, measured as b* value, of less than 15, a residual monomer content of less than 0.5 wt %, and less than 50 bs/kg.

It has been possible to ascertain, surprisingly, that polylactides with extremely high quality and character can be prepared with the method of the invention.

In the sense of the elucidations that have been made, the definitions which apply are as follows:

PLA: A polymer consisting substantially or entirely of lactide structural units.

Monomer: This refers primarily to dilactide, or simply just lactide. Lactide is the cyclic diester of lactic acid. Lactide comprehends the L,L-dilactide, the D,D-dilactide, and also the meso-dilactide, consisting of one L- and one D-unit.

Demonomerization: Removal, or apparatus for removal, of monomer from a polymer by transfer of the monomer to the gas phase and separation of the monomer-containing gas phase from the polymer. In addition to the monomer, there are always other volatile components present in the polymer, such as lactic acid, cyclic and linear oligomers, and also products of thermal polymer degradation, which are removed together with the monomer. On account of their low concentration by comparison with the monomer, they are not identified further in the text and are always included in the term "monomer".

Thin-film evaporator: A vertically standing, cylindrical apparatus with an internal wiper system, which distributes the incoming polymer melt uniformly over the surface, which is temperature-conditionable from the outside, and conveys the polymer melt downwards. As a result of the conveying action of the rotor blades, a continually self-renewing melt surface is generated. The residence time in the apparatus and the surface renewal rate can be adjusted by altering the rotary speed of the rotor. The discharge of the melt from the apparatus is assisted by the rotor shaft, which is specially shaped in the discharge cone.

Temperature-conditioning zone: Region of the thin-film evaporator in which the temperature can be adjusted by a heat transfer medium which flows in this zone within the jacket of the thin-film evaporator. A thin-film evaporator may possess up to five temperature-conditioning zones independent from one another.

Triple point: Point in the pressure-temperature diagram of a pure substance at which all three phases—solid, liquid, and vapour—coexist. The triple point is the meeting point of the solid/liquid, liquid/vapour and solid/vapour phase boundary lines.

For pure L-lactide, this point is situated at 96.9° C. and 1.4 mbar. For the purposes of this invention, this value should not be regarded as absolute—it depends on the composition of the lactide in the method presented. The triple point is affected both by the amount of the optical isomers L-lactide, meso-lactide and D-lactide, and also by by-products of the PLA polymerization, which evaporate or sublime together with the lactide in the demonomerization. These products include lactic acid and other cyclic or linear oligomers of PLA, and also degradation products from the PLA polymerization.

Desublimation: Direct transition of a substance from the vapour state into the solid state at pressures and temperatures below the triple point, i.e. without passing through the liquid state in between. The opposite of sublimation.

Stabilization: In order to prevent the monomer reforming after polymerization and demonomerization, and so impairing the product quality, the catalyst for the ring-opening polymerization must be deactivated by addition of suitable additives. Suitable substances for stabilization are described in the relevant literature.

Black specks: Small particulate solids, mostly carbon-based, which form through degradation of the polymer as a consequence of long residence times at high temperatures, and possess an (average) diameter of more than 100 micrometres, so that they are visible in the product to the naked eye. If an apparatus for the processing of polymers produces black specks, this is a sign of dead zones within the apparatus, in other words of regions which are not traversed by flow and in which polymer is able to deposit and degrade.

The degraded polymer is then washed out of the apparatus from time to time as black specks with the polymer.

The invention relates in particular to a method for demonomerizing a PLA melt in a thin-film evaporator. It is applicable to any polymer melt which consists substantially of lactide structural units, independently of the enantiomer composition, and has been prepared in a ring-opening polymerization.

FIG. 1 shows an exemplary embodiment of a thin-film treatment apparatus of the invention in the form of a thin-film evaporator 1, as used in the method of the invention. In this thin-film evaporator 1, via an inlet port 2, for example, monomer-containing PLA can be introduced continuously into the thin-film evaporator 1, as a liquid or viscous melt, in particular directly after the continuous polymerization. The viscous, liquid-melt PLA is distributed uniformly over the temperature-conditionable inner surface of the treatment chamber 13 of the thin-film evaporator 1, by wiper blades 3 connected to a central rotor shaft 6, and is transported downwards in the treatment chamber 13. Another feature of the equipment is that the central rotor shaft 6 is fitted, in the conical outlet region, with specially shaped conveying elements 4, such as a conveying screw, for example, which force the viscous melt into the intake region of the discharge pump 5. This discharge pump 5 is a gear pump with a specially shaped, very wide intake region. The construction of the wiper blades 3 and the discharge screw 4 is such that a residence time of the melt in the thin-film evaporator as a whole does not exceed 20 minutes and there are no dead zones formed that lead to degradation of the product. The monomer vapour leaving the melt is drawn off from the thin-film evaporator 1 via the vapour port 7, in counter-current to the melt flow. Temperature conditioning of the equipment is accomplished by a heat transfer medium, which is circulated by means of a pump 12 within the jacket 10 of the thin-film evaporator 1, the temperature of this medium being adjustable. The thin-film evaporator 1 possesses at least one housing jacket segment 10. The temperature of the heat transfer medium must be able both to be increased actively by a heater 8 and also cooled actively by a cooler 9. The heater 8 is needed particularly for the start-up operation, so that the thin-film evaporator 1 can be heated to operating temperature (180° C.-220° C.). The cooler 9 is an essential element for operation. It ensures that the product temperature during demonomerization does not increase too sharply and that the product is not damaged. The thin-film evaporator 1 possesses three temperature sensors 11. In operation of the thin-film evaporator, the temperature sensors 11 are submerged into the film of the product. At different locations in the product mixture, accordingly, the temperature can be monitored continually. By the central rotor shaft 6, moreover, inert gas can be put into the treatment chamber 13 in order to improve the demonomerization performance.

The demonomerization is operated under reduced pressure. It holds true here that the lower the reduced pressure, the better the demonomerization performance. The thin-film evaporator is operated typically at a pressure of less than 10 mbar (absolute).

Figure 2:
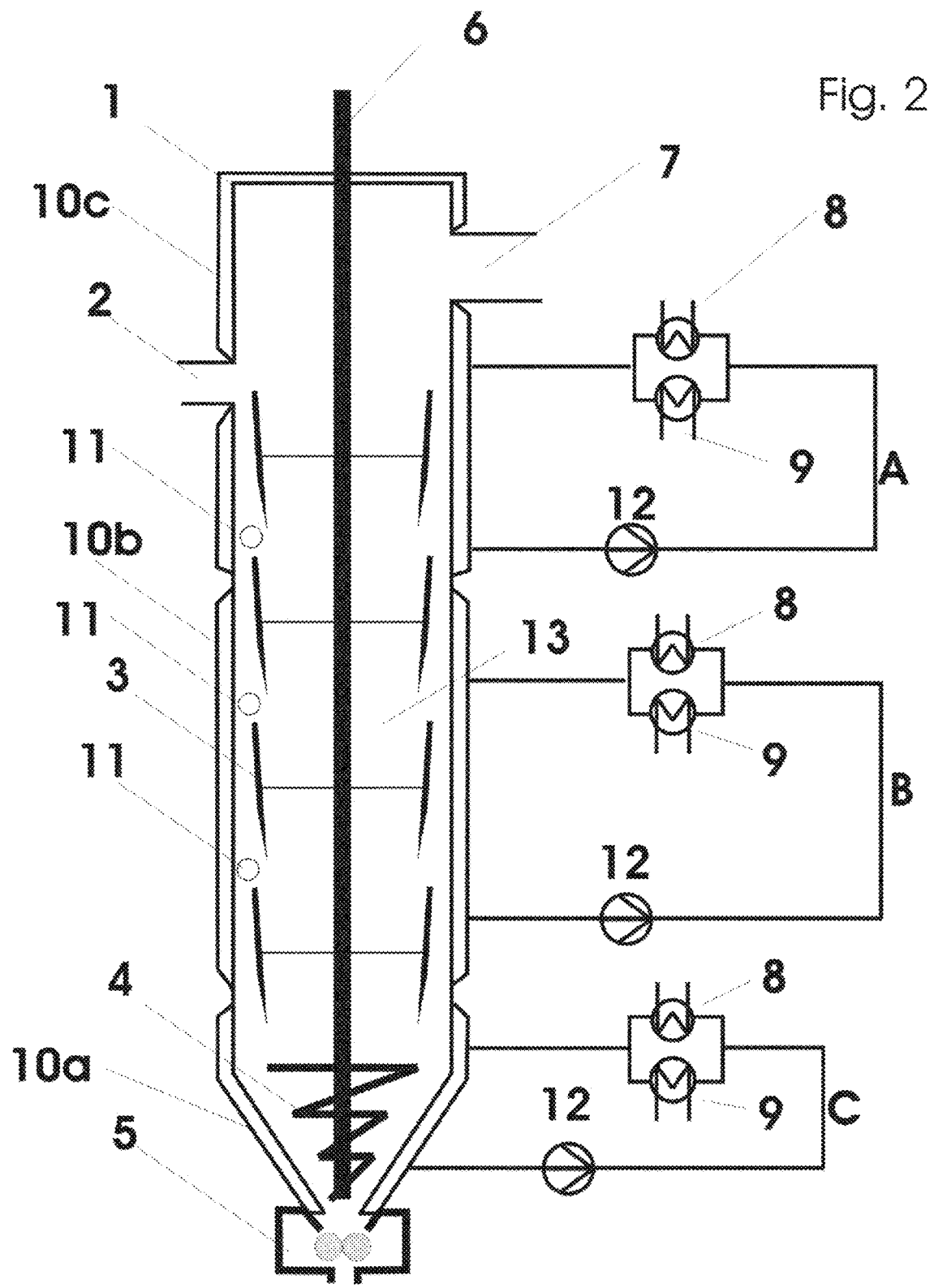
FIG. 2 is another embodiment of a thin-film treatment apparatus of the invention.

A further embodiment of a thin-film treatment apparatus of the invention is shown in FIG. 2. The thin-film evaporator 1 in this case is substantially identical with FIG. 1, the sole and essential difference being that the cooling or temperature-conditioning jacket comprises three separately conditionable housing jacket segments 10a, 10b and 10c. These individual housing jacket segments 10a, 10b and 10c are each supplied via a separate circuit A, B and C for the temperature conditioning of the respective housing jacket segments 10a, 10b and 10c of the heating/cooling jacket 10 of the thin-film evaporator 1. At different vertical locations in the thin-film evaporator 1, therefore, it is possible to select different temperature regions and/or to set targeted temperature gradients over the thin-film evaporator 1 as a whole. Each cooling/heating circuit A, B and C for the individual housing jacket segments 10a, 10b and 10c of the temperature-conditioned jacket 10 of the thin-film evaporator 1 possesses a separate pump 12 and also heating elements 8 and/or cooling elements 9. The housing jacket segments 10b and 10c possess temperature sensors 11; in the housing jacket segment 10b, for example, there are two temperature sensors accommodated; the housing jacket segment 10c has a further temperature sensor 11. The housing jacket segment 10a (discharge zone) does not possess a temperature sensor. Moreover, provision may be made for the housing jacket segment 10c to be subdivided further—for example, provision may be made for separate temperature-conditioning of the part below the input port 2, while the part above the input port 2, where the vapour port 7 is located, likewise possesses a separate temperature-conditioning circuit. In this case, provision may then be made for no temperature sensor to be present in the upper housing jacket segment (conditioning zone), whereas a temperature sensor 11 is present in the separate housing jacket segment formed below the input port 2.

Figure 3:
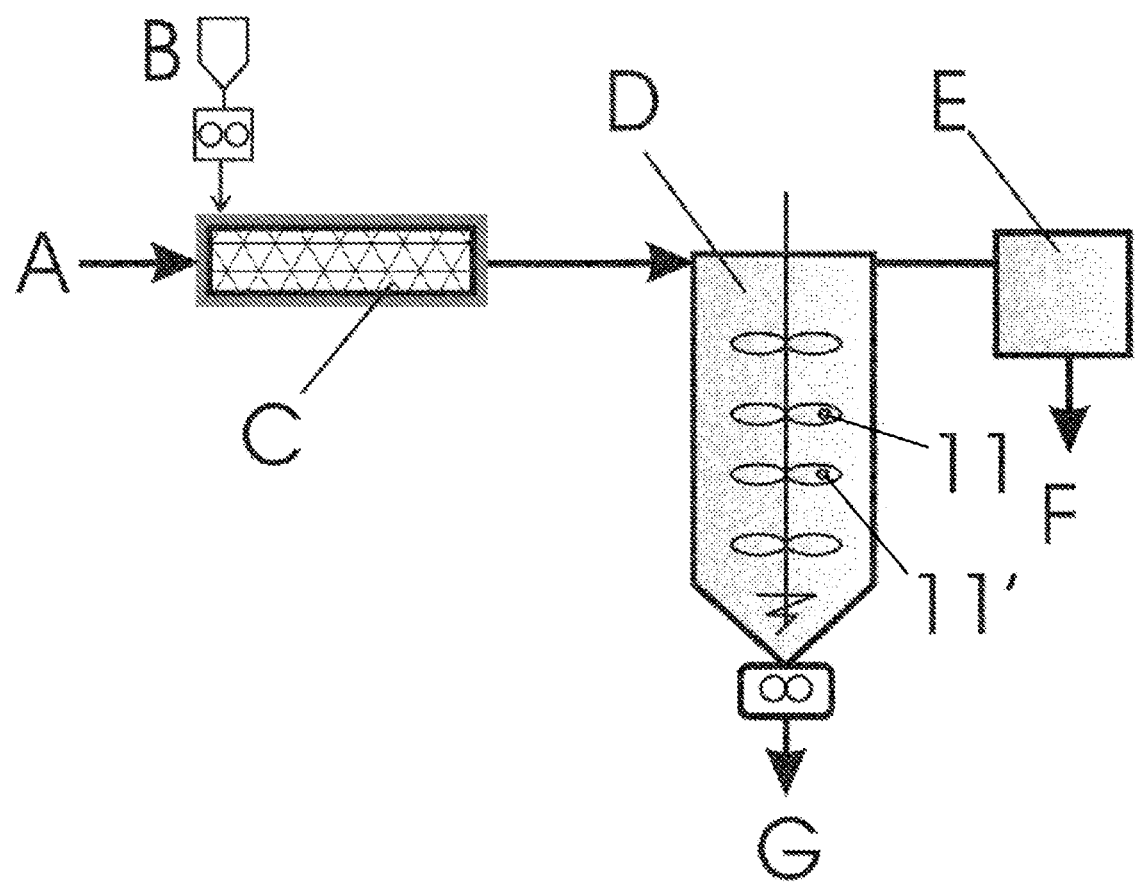
FIG. 3 is a combination of a thin-film treatment apparatus of the invention with a mixing element and also a condenser and/or desublimator.

FIG. 3 shows an embodiment of the thin-film evaporator of the invention with an upstream static mixer C and also with a downstream apparatus E for condensing the discharged gaseous compounds. The thin-film evaporator in this case comprises two temperature sensors 11. The static mixer C connects to the inlet for product (see reference symbol 2 in FIG. 1), while the condensation apparatus E connects with the vapour port (see reference symbol 7 in FIG. 1) of the thin-film evaporator.

Polylactide melt A is carried into the mixer C. The static mixer C here may be fed with a metered addition of additives B, especially stabilizers for deactivating any catalyst still present in the polylactide melt. This prevents further reaction of the polylactide melt in the static mixing element C and/or in the thin-film evaporator D. Discharged gaseous compounds, particularly lactide, can be condensed in a downstream condensation apparatus E, and the monomer can therefore be withdrawn in liquid form from the condensation apparatus E (reference symbol F).

The thin-film evaporator according to FIG. 3 comprises two temperature sensors 11 and 11', which are formed in accordance with the embodiments of the thin-film evaporators according to the above-described figures.

While the pressure is above the triple-point pressure of dilactide (1.4 mbar), the monomer can be recovered (F) by condensation (E). In order to achieve particularly low residual monomer levels in the melt, however, operation at a pressure below 1 mbar is needed. In that case the lactide must be recovered by means of desublimation (E).

Rather than by a reduction in the pressure to below 1 mbar, the evaporation of the monomer can be facilitated by introduction of an inert gas into the thin-film evaporator. The presence of the inert gas here acts like a pressure reduction in that it lowers the partial pressure of the monomer in the gas phase, thereby in turn increasing the driving concentration difference between melt and gas phase. In this manner, the demonomerization can take place above the triple-point pressure of dilactide, with very good demonomerization performance at the same time. If there is a desire to reduce the residual monomer content still further, the inert gas can also be added at a pressure in the thin-film evaporator of less than 1 mbar.

Finally, in order to acquire residual monomer levels that are as low as possible, it is necessary to mix the stabilizer (B) into the melt (A) for deactivating the catalyst ahead of the thin-film evaporation (D). For economic reasons, the mixing of stabilizer and melt is best done in a static mixer (C). Addition after the demonomerization (G), as described in EP 2698394 or else in EP 1070097, is not sufficient to lower the monomer content of the melt by a factor of at least 5.

LIST OF REFERENCE SYMBOLS

1 Thin-film treatment apparatus; thin-film evaporator
2 Inlet port
3 Rotor blade; wiper blade element
4 Conveying element
5 Discharge pump
6 Rotor shaft body
7 Vapour port
8 Heater
9 Cooler
10 (a,b,c) Housing jacket segments
11 Temperature sensors
12 Pump
13 Treatment chamber The present invention is elucidated in more detail by way of example with reference to the experiments below.

Analytical Methods

Residual Monomer Content of PLA

The PLA sample is dissolved in chloroform and precipitated with isopropanol. The precipitated PLA is removed by filtration to leave the low molecular mass constituents in the solution.

Following addition of pentamethylbenzene as internal standard, the solution is separated into its constituents in a gas chromatograph on a DB-5; 15/0.32 capillary column, and lactide is detected quantitatively with a flame ionization detector.

Molecular Weight (Weight Average)

The weighed quantity of polymer is dissolved in a defined volume of chloroform. In an Ubbelohde capillary viscometer, which sits in a thermostatic water bath adjusted to 20° C.+/−0.1° C., measurements are made of the transit time of the solution and of the pure solvent. The ratio of these two is the relative solution viscosity. It is converted by the single-point method of J. Dorgan et al., J. Polym. Sci.: Part B: Polym. Physics, Vol. 43,3100-3111 (2005), into the intrinsic viscosity (I.V.). The connection between the I.V. and the weight-average molar mass of the polymer is that described by the equation known as the Mark-Houwink equation. For the PLA/chloroform duo, the equation is as follows (J. Dorgan, loc. cit.):

$$I.V. = K * M_w^a, \text{ where } K=1.53*10-4, a=0.759$$

L*a*b* Colour Space

The coloristic values are determined on an amorphous polymer which has been ground to powder. The polymer may take the form either of strands (prior to the demonomerization) or amorphous granules (after the demonomerization). The coloristic values of the L*a*b* colour space are measured by means of a colour spectrophotometer which is calibrated against a white standard. The light from a standard light source is reflected by the powdered polymer. The intensity of the reflected radiation is determined by a photocell. The L* value indicates the luminance. The colour of the sample material is described by two axes, with the b* values indicating the discoloration in the direction of blue (negative b* value) or yellow (positive b* value). The a* value indicates the red or green tonality.

EXAMPLES

Example 1: Demonomerization of a PLA Melt of Low Molecular Weight in an Inventive Thin-Film Evaporator In a pilot plant, dilactide is polymerized to PLA in a combination of stirred tank and tubular reactor, as described for example in EP 2188047. Subsequently, in a static mixer, a stabilizer is mixed in so as to deactivate the catalyst. The molecular weight of the polymer after the tubular reactor is 171 000 g/mol and the monomer content is 4.8%. The b* colour value was ascertained as being 5.4. The temperature at entry was 186° C. The melt enters a thin-film evaporator which is equipped with four conditioning zones. Mounted on the rotor shaft are two temperature measurement points sensors 11, 11', which are able to directly measure the temperature of the melt in the thin-film evaporator, as shown in FIG. 3. The temperature sensor 11 here is arranged at the height of the second conditioned zone, which adjoins the intake zone (with inlet for the product) at the bottom. The second temperature sensor 11' is arranged at the height of the third conditioned zone (below the second zone). Intake zones and discharge zones do not possess temperature sensors. The admission temperatures of the heat transfer media was set at 192° C. in all four conditioning zones. In the steady state, a product temperature of 203° C. at the upper temperature measurement sensor point 11 and a product temperature of 205° C. at the lower temperature measurement sensor 11' were established. After the demonomerization, a monomer content of 0.16% was measured. The molecular weight was 168 000 g/mol and the b* colour value was unchanged. The numerical values are collated in the table below.

Example 2: Demonomerization of a PLA Melt of High Molecular Weight in an Inventive Thin-Film Evaporator The procedure from example 1 was repeated. The PLA product, however, had a higher viscosity, causing a greater rise in temperature of the melt in the thin-film evaporator. To compensate this, the temperatures in the conditioning zones were reduced. The results are collated in the table.

From examples 1 and 2 it is clear that there is no marked reduction in molecular weight and no increase in the b* colour value under these conditions.

Example 3: Demonomerization of a PLA Melt of High Molecular Weight in an Inventive Thin-Film Evaporator Without Cooling The procedure from example 2 was repeated, but the temperature in the conditioning zones was set at 210° C. This caused an increase in the melt temperature to 231° C.

As can be seen from the data in the table, there was a marked reduction in molecular weight, and the b* colour value climbed from 6.4 to 8.2. Moreover, the residual monomer content is higher than in the two preceding examples. This demonstrates that in the absence of adequate temperature control in the thin-film evaporator, a product deteriorates in the course of demonomerization in the thin-film evaporator.

Example 4: Effect of the Stabilizer on the Monomer Content

The procedure from example 2 was repeated, except that no stabilizer was metered before the demonomerization. As can be seen from the data in the table, the monomer content after the thin-film evaporation rises to more than 1.5%. The monomer content is therefore reduced by a factor of only 2.7. It is therefore vital that the PLA melt is stabilized before the demonomerization.

TABLE

|       |                                  | Ex. 1    | Ex. 2    | Ex. 3    | Ex. 4    |
|-------|----------------------------------|----------|----------|----------|----------|
| Entry | Monomer content                  | 4.8      | 5.2      | 5.0      | 4.9      |
|       | Molecular weight                 | 171 000  | 230 000  | 239 000  | 222 000  |
|       | Temperature                      | 186° C.  | 186° C.  | 186° C.  | 190° C.  |
|       | b* colour value                  | 5.4      | 6.2      | 6.4      | 6.8      |
|       | Admission temperature[1]         | 192° C.  | 190° C.  | 210°     | 195° C.  |
|       | Product temperature[2]           | 203° C.  | 208° C.  | 226° C.  | 209° C.  |
|       | Product temperature[3]           | 205° C.  | 213° C.  | 231° C.  | 213° C.  |
| Exit  | Monomer content                  | 0.16%    | 0.18%    | 0.31%    | 1.42%    |
|       | Molecular weight                 | 168 000  | 227 000  | 220 000  | 219 000  |
|       | b* colour value                  | 5.4      | 6.5      | 8.2      | 6.9      |

[1]Admission temperature of the heat transfer medium in all four temperature zones
[2]Product temperature in the second conditioning zone (sensor 11)
[3]Product temperature in the third conditioning zone (sensor 11')

What is claimed is:

1. A method for removing compounds in gaseous aggregate state from a polymer melt containing polylactide and/or a poly(co)lactide, said melt comprising said compounds in liquid or solid aggregate state, with a thin-film treatment apparatus comprising:
   a housing having a heatable and/or coolable housing jacket which surrounds a rotationally symmetrical treatment chamber extending in an axial direction,
   at least one inlet port, arranged in an inlet region of the housing, for introducing material to be treated into the treatment chamber,
   at least one outlet port arranged in an outlet region of the housing, for discharging the material from the treatment chamber, and
   a drivable rotor shaft arranged in the treatment chamber and extending coaxially therewith, for generating a film of the material on an inside face of the housing jacket and for conveying the material from the inlet region to the outlet region, the rotor shaft comprising a central rotor shaft body with rotor blades arranged on the periphery of said body, radially outermost ends of said blades being spaced a distance from the inside face of the housing jacket, and
   at least one temperature sensor arranged on the rotor shaft in the treatment chamber for measuring the temperature of the film of material, wherein the at least one temperature sensor is positioned on the rotor shaft for submersion in the film during operation of the thin-film treatment apparatus, the method comprising:
   carrying the polymer melt in a viscous aggregate state having a viscosity in a range of 1 to 50,000 Pa·s into the treatment chamber via the at least one inlet port,
   generating a film of the polymer melt on the inside face of the housing jacket,
   converting at least a portion of the compounds present in the liquid or solid aggregate state in the polymer melt into the gaseous aggregate state,
   discharging at least a portion of the compounds in the gaseous aggregate state from the thin-film treatment apparatus,
   discharging the polymer melt after treatment in the thin-film treatment apparatus via the at least one outlet port from the thin-film treatment apparatus, and
   determining a local temperature value of the film at one or more location with the at least one temperature sensor that is disposed on the rotor shaft and is submerged in the film.

2. The method of claim 1, including comparing the temperature value determined with a setpoint value and regulating an amount of heat to be removed from or added to the polymer melt depending on the deviation from the setpoint value.

3. The method of claim 2, including regulating the amount of heat to be removed from or added to the polymer melt at least partly by way of the amount of heat to be removed from or added to the housing jacket and/or by way of a rotary speed of the rotor shaft.

4. The method of claim 1, wherein the compounds to be removed are selected from the group consisting of lactide, lactic acid, lactic acid dimers, and lactic acid oligomers that are in gaseous form under operating conditions in the thin-film treatment apparatus, water and additives of the polymer synthesis.

5. The method of claim 4 wherein the additives include one or more of catalysts, initiators, or stabilizers.

6. The method of claim 1, wherein the thin-film treatment apparatus is in the form of a thin-film evaporator, a thin-film drier, or a thin-film reactor.

7. The method of claim 1, including assigning a signal line to the at least one temperature sensor and passing a signal indicative of temperature from the at least one temperature sensor to an external signal processing apparatus.

8. The method of claim 1, including a plurality of temperature sensors distributed over the length of the treatment chamber.

9. The method of claim 1, wherein the rotor blades are operated with a rotary speed of about 0.1 to 10 m/s, and/or the rotor blades are used to set a shear rate of not more than 1000 1/s, the shear rate being the ratio of the peripheral speed to the distance of the rotor blades from the inside wall of the treatment chamber.

10. The method of claim 9, wherein the rotor blades are operated with a rotary speed of from 0.5 to 2 m/s.

11. The method of claim 9, wherein the rotor blades are used to set a shear rate of not more than 300 l/s.

12. The method of claim 1, wherein the interior of the housing jacket includes a housing jacket cavity which is traversed by a flow of a heat transfer medium for the purpose of heating and/or cooling.

13. The method of claim 1, wherein the housing jacket comprises at least two housing jacket segments which are heated and/or cooled independently of one another.

14. The method of claim 13, wherein the housing jacket segments each surround a corresponding treatment chamber zone, and temperature sensors are distributed over different treatment chamber zones.

15. The method of claim 1, wherein the temperature value obtained from the polymer melt is used to adjust the temperature of the heatable and/or coolable housing jacket to a setpoint value, the housing jacket includes at least two housing jacket segments that each possess at least one temperature sensor, and a separate adjustment of the temperature takes place in each of the at least two housing jacket segments by means of a respective measurement value of the temperature of the film of the polymer melt in each respective housing jacket segment.

16. The method of claim 15, wherein a viscosity of the polymer melt carried into the treatment chamber is at least 300 Pa·s, and further comprising:
   adjusting a pressure which is reduced relative to standard conditions to a pressure of below 100 mbar,
   discharging compounds in the gaseous aggregate state via the vapour port, and
   recovering the discharged compounds in a downstream apparatus configured to recover gaseous compounds from the gaseous aggregate state by condensation and/or desublimation,
   wherein the residence time of the polymer melt in the thin-film treatment apparatus is from about 2 to 4 min, and/or the temperature of each of the housing jacket segments is adjusted to a temperature lower than the temperature of the polymer melt fed into the treatment chamber, and temperature-conditioned to a temperature of 130 to 250° C.

17. The method of claim 1, wherein before the polymer melt is carried into the treatment chamber, one or more of deactivators, additives, stabilizers,_ or mixtures thereof are fed into the polymer melt via a static mixer which is engaged upstream of the thin-film treatment apparatus.

18. The method of claim 1, including:
   reducing a pressure in the thin-film treatment apparatus to less than 100 mbar; and
   feeding an inert gas into the atmosphere in the interior of the thin-film treatment apparatus.

19. The method of claim 1, wherein the amount of the compounds in the polymer melt after passage through the thin-film treatment apparatus is not more than 0.2 times the amount of the compounds before passage through the thin-film treatment apparatus,
   wherein the residual lactide content of the polymer melt after passage through the thin-film treatment apparatus is less than 0.5% by weight,
   the yellowing of the polymer melt, measured as b* value, during the conduct of the method is increased by not more than 4 scale values,
   the yellow coloration of the polymer melt, measured as b* value, after passage through the thin-film evaporator is less than 15, and
   during the method a maximum of 50 black specks are formed per kilogram of discharged polymer melt, and/or
   the weight-average molecular weight of the polymer melt after conduct of the method and after demonomerization is not more than 20% lower than the weight-average molecular weight of the polymer melt fed into the thin-film treatment apparatus.

20. The method of claim 1 wherein the at least one temperature sensor is disposed on one of the rotor blades of the rotor shaft.

* * * * *